US 6,528,957 B1

(12) United States Patent
Luchaco

(10) Patent No.: US 6,528,957 B1
(45) Date of Patent: Mar. 4, 2003

(54) POWER/ENERGY MANAGEMENT CONTROL SYSTEM

(75) Inventor: David Luchaco, Fogelsville, PA (US)

(73) Assignee: Lutron Electronics, Co., Inc., Coopersburg, PA (US)

(*) Notice: Subject to any disclaimer, the term of this patent is extended or adjusted under 35 U.S.C. 154(b) by 0 days.

(21) Appl. No.: 09/657,835

(22) Filed: Sep. 8, 2000

Related U.S. Application Data

(60) Provisional application No. 60/152,724, filed on Sep. 8, 1999, and provisional application No. 60/153,107, filed on Sep. 9, 1999.

(51) Int. Cl.[7] .............................................. H05B 39/04
(52) U.S. Cl. ........................ 315/307; 307/31; 307/35
(58) Field of Search .................................. 315/112, 129, 315/135, 136, 291, 307, 362, DIG. 4; 364/528.34, 528.38, 140.05, 140.1, 150; 307/31, 35

(56) References Cited

U.S. PATENT DOCUMENTS

| 4,075,699 A | | 2/1978 | Schneider et al. ........... 364/492 |
|---|---|---|---|
| 4,139,801 A | | 2/1979 | Linares ........................ 315/83 |
| 4,370,723 A | * | 1/1983 | Huffman et al. .............. 307/35 |
| 4,425,628 A | * | 1/1984 | Bedard et al. .................. 710/8 |
| 4,461,977 A | | 7/1984 | Pierpoint et al. ............. 315/159 |
| 4,819,180 A | | 4/1989 | Hedman et al. .............. 364/492 |
| 4,943,762 A | * | 7/1990 | Campbell et al. ............. 323/276 |
| 4,977,515 A | | 12/1990 | Rudden et al. ............... 364/492 |
| 5,196,982 A | | 3/1993 | Landsberg et al. ............. 361/93 |
| 5,309,068 A | | 5/1994 | Hakkarainen et al. ....... 315/362 |
| 5,357,170 A | | 10/1994 | Luchaco et al. ............. 315/159 |
| 5,462,225 A | * | 10/1995 | Massara et al. ............... 236/47 |
| 5,572,438 A | | 11/1996 | Ehlers et al. ................ 364/492 |
| 6,215,202 B1 | * | 4/2001 | Luongo et al. ................ 307/23 |

* cited by examiner

Primary Examiner—Don Wong
Assistant Examiner—Thuy Vinh Tran
(74) Attorney, Agent, or Firm—Ostrolenk, Faber, Gerb & Soffen, LLP

(57) ABSTRACT

A power management system controls power and energy drawn by a load monitoring total drawn power and energy and modifying load usage. A power meter monitors power drawn by a load and provides a control circuit with an indication of power draw. The control circuit controls the power delivered to the load based on predetermined criteria, such a power threshold. Other sensors and controls such as environment status detectors or emergency commands are used by the control circuit to adjust the power provided to the load, or even to shut off power to the load. The control circuit can be a microprocessor based controller, or can be a remotely located personal computer which interacts with load drivers through a communication link. The control circuit can also have a profile for operation under various criteria, with profile parameters adjustable depending upon conditions. The profile parameters can be adjusted automatically by a control program, or by a user remotely. The control circuit can also drive the load at a known value and compare the power drawn with a stored reference value for the load. The system can thus be evaluated for failed or degraded components based on changes in the expected power draw.

46 Claims, 3 Drawing Sheets

POWER/ENERGY MANAGEMENT CONTROL SYSTEM

This application claims the priority and benefit of and incorporates by reference U.S. provisional patent application serial No. 60/152,724 filed Sep. 8, 1999 and U.S. provisional application serial No. 60/153,107 filed Sep. 9, 1999, each entitled POWER/ENERGY MANAGEMENT CONTROL SYSTEM.

BACKGROUND OF THE INVENTION

1. Field of the Invention

The present invention relates generally to a power and/or energy management system and, more particularly, to a system capable of monitoring the power and/or energy being consumed by a load and reducing the power and/or energy being consumed in order to stay below a predetermined value.

2. Related Art

Energy management systems capable of turning connected loads on and off to maintain the total connected power consumption below a predetermined maximum value are well known.

U.S. Pat. No. 5,196,982 to Landsberg et al. and assigned to The Fleming Group discloses a method and system incorporating an integral power consumption monitor-circuit breaker panel for industrial or commercial buildings and facilities. The power consumption monitor-circuit breaker panel not only protects each end use within the building against harmful overloads, but also monitors peak power demands of each end use. Electrical current, voltage and phase information is provided by each monitor-breaker. This information is then fed to a processing circuit that provides a power consumption value. The power consumption value is then fed to a recording device to provide a power consumption history for each end use. Each monitor-breaker is identified by its end use, as for example, by color coding. The monitor device of each circuit breaker is designed to provide a voltage that is proportional to the circuit load. Two methods may be used to provide such a voltage signal: a) the voltage signal can be developed across a built-in shunt in each circuit breaker; and b) a proportional voltage can be obtained by use of a circuit breaker with a built-in Hall effect device, wherein the product of the instantaneous current and voltage, along with the phase angle between them, provides the power measurement. The current and/or instantaneous power information can be sent to the recording device via a power line carrier, radio link, or optical fiber. The information can be integrated to provide either kW or kW·hr readings.

U.S. Pat. No. 4,819,180 to Heldman et al. and assigned to Dencor Energy Cost Control, Inc. discloses a method and system for regulating power delivered to different commercial or residential users in which each user has variable demands for power consumption, there being a power source from which power is transmitted by a utility to each user and a utility control signal which is transmitted from the utility to each user in order to modify the power consumed by each user, the method and system of the Heldman et al. reference being characterized by measuring the power consumption of each user over a selected real time interval, and modifying the power consumption by each user by an amount directly related to the power consumption measurement of each user over that time interval.

U.S. Pat. No. 4,977,515 to Rudden et al. discloses a plug in device, furnished by an electric power utility to a customer, which is installed by the customer between a wall outlet and an appliance, particularly a room air conditioner. The device contains a microprocessor that is programmable and controllable by the utility to determine the ON-OFF cycling of the appliance. The microprocessor, with the aid of sensors, records date and time of each instance that a programmed OFF interval is overridden through a manual input, and each instance of disconnection of the appliance from the device after the first connection. Also, the device is arranged on command to record the power being drawn by the attached appliance, either on a one time basis or on a scheduled interval over a predetermined time span. A remote transmitter is also provided as a source of customer I.D. and control signals for utility control of selected devices in use. Certain embodiments have a component that is installed by qualified personnel, hard wired into a control circuit, having a removable component removable either by service personnel or the customer for return to the utility to read out the contents of its memory as to its history of use. Similarly, the customer installed unit is returned or has a component returned for utility readout.

U.S. Pat. No. 4,075,699 to Schneider et al. and assigned to Lockheed Electronics Co., Inc. discloses an electrical power controlling/load shedding system that includes power consumption metering and meter interfacing circuitry for entering overall power consumption into a central processing unit (CPU). The CPU memory includes a data storage table characterizing each system electrical load under each of a hierarchy of operational levels, and circuitry is provided for turning local and remote loads on/off, responsive to CPU-issued commands. The digital computing apparatus operates on the meter supplied information and projects energy consumption over the monitoring interval. If power must be shed to obviate an excessive projected demand, loads are examined seriatim and selectively shed on a priority basis as required, depending upon the operational parameters and status characterizing each load for the then prevailing load level condition.

U.S. Pat. No. 5,572,438 to Elhers et al. and assigned to TECO Energy Management Services discloses an energy management and building automation system including a local area network or home automation data bus such as the CEBus. Each load is connected to the bus via a control module which may contain a circuit breaker to disconnect the load from the mains upon command or upon occurrence of a power outage. Current monitoring control modules measure load current and power monitor modules monitor power consumed by selected loads, both modules transmitting bus messages indicating load status and status changes. A first microcomputer preferably is external to the customer premises, adjacent the electric utility power meter. A second microcomputer preferably is inside the customer premises. The two microcomputers communicate with each other and with the various modules via the network/data bus. The first microcomputer communicates with the utility company via any appropriate communications link. The second microcomputer serves, in part, as an input/output terminal for the system, allowing the customer to set parameters and query the system as to power usage, displaying reports requested by the customer and messages transmitted by the utility company and by either microcomputer. The first microcomputer acts as a master controller and/or network server, communicating with the world outside the premises, as a communications gateway between voice, video and data services, and as the primary data collector and operator of the load control modules; the second microcomputer provides certain backup functions. The utility company can access selected utilization data and control at least some loads via messages to the first microcomputer.

Unfortunately, the preceding patents disclose systems which completely disconnect one or more selected loads (reduce output power to zero) when the power usage exceeds a predetermined maximum. None of these systems have the ability to reduce the power/energy to the load without completely disconnecting the load. Accordingly there is a need in the art for a new power/energy management system capable of monitoring output power/energy draw and varying available output power/energy to maintain desirable output power/energy draw.

SUMMARY OF THE INVENTION

In order to overcome the disadvantages of the prior art, a circuit for controlling power drawn from a source of utility power and delivered to a load according to the present invention includes:

a power monitoring circuit operable to produce a sense signal indicative of an amount of output power drawn by the load;

a control circuit operable to receive the sense signal from the power monitoring circuit and produce a control signal indicative of whether the amount of power drawn from the source by the load has exceeded a threshold; and an output circuit operable to receive input power from the source and deliver the output power to the load, the output circuit reducing the output power when the control signal indicates that the threshold has been exceeded.

BRIEF DESCRIPTION OF THE DRAWINGS

The foregoing summary, as well as the following detailed description of the preferred embodiments of the invention is better understood when read in conjunction with the appended drawings. For the purposes of illustrating the invention, there are shown in the drawings embodiments which are presently preferred, in which like numerals represent similar parts throughout the several views of the drawings, it being understood, however, that the invention is not limited to the specific methods and instrumentalities disclosed.

DETAILED DESCRIPTION OF THE PREFERRED EMBODIMENT

Figure 1:
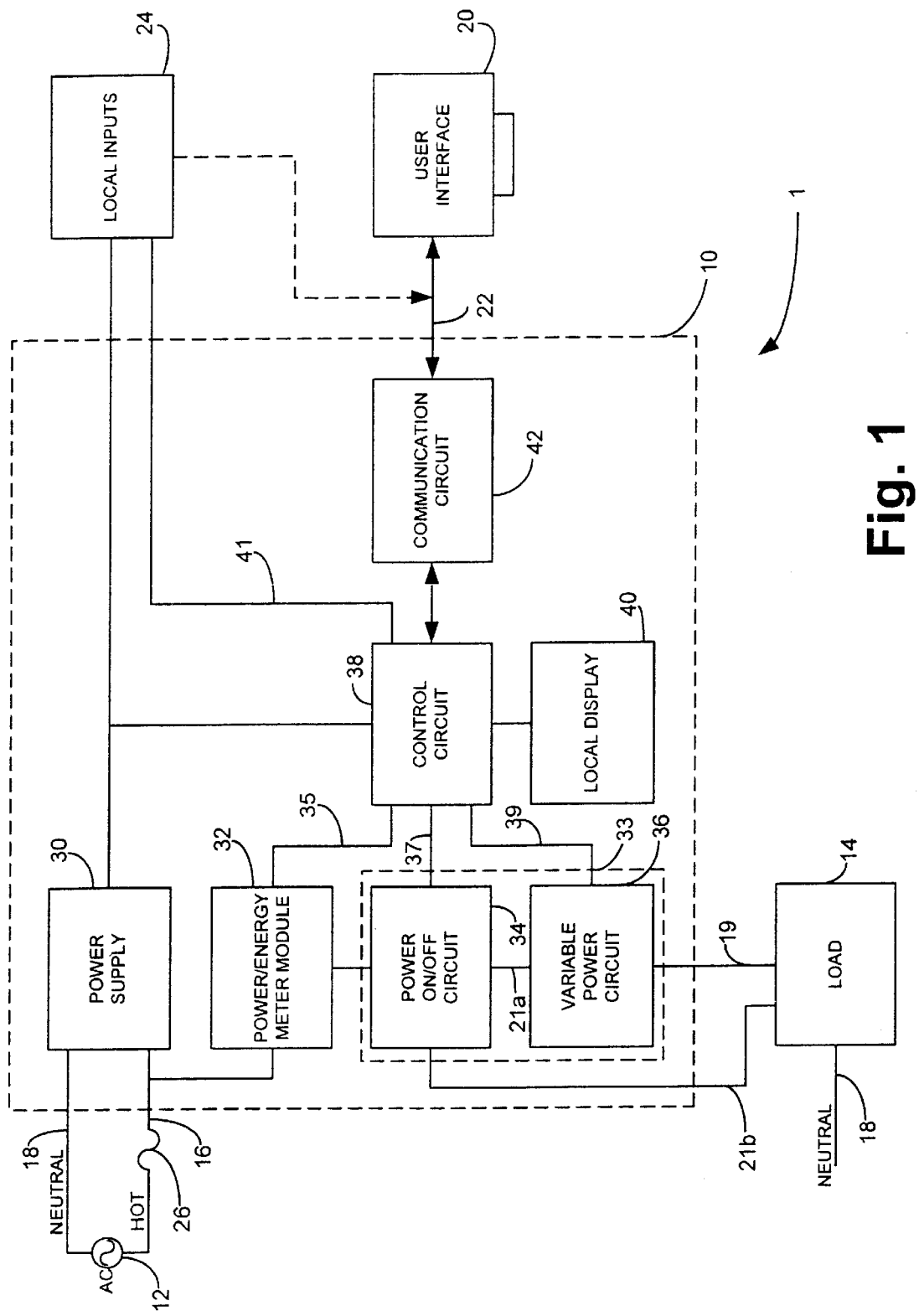
FIG. 1. is a block diagram of a power/energy management system of the present invention.

Referring now to the drawings, FIG. 1 is a block diagram of a power/energy management system 1 including an AC source 12, an electrical power controller module 10, a load 14, controls and sensors 24, and a user interface 20.

The electrical power controller 10 preferably includes a power supply 30, a power/energy meter module 32, an output circuit 33 (including a power ON/OFF switching circuit 34 and variable power switching circuit 36), a control circuit 38, a display 40, and a communications circuit 42. The electrical power controller module 10 is operable to receive input power from the AC source 12 (preferably utility power: 100–347 VAC, 50–60 Hertz) and deliver output power to the load 14 (over conductor 19 or conductor 21b) such that the output power is reduced at least when the load draws too much power. Those skilled in the art will appreciate that the load 14 may obtain the neutral lead 18 connection through the electrical power controller module 10 or directly.

The load 14 can be any controllable load with utility loads being most preferred, such as a lighting load (e.g., incandescent, magnetic or electronic ballast low voltage fluorescent or high intensity discharge) or a motor load.

The power supply 30 receives the input power from the AC source 12 (through a fuse/circuit breaker 26, a hot lead 16 and the neutral lead 18) and provides operating power to the control circuit 38 and the controls and sensors 24. It is noted that the controls and sensors 24 may receive operating power from another power supply (not shown) internal or external to the electrical power controller module 10 rather than from power supply 30.

The power/energy meter module 32 is operable to receive at least the hot lead 16 from the AC source 12 such that the power/energy drawn from the AC source by the load 14 may be monitored. It is preferred that the power/energy meter module 32 senses the voltage, phase, and current in the hot lead 16 and produces at least one sense signal indicative of the power and/or energy drawn by the load 14. The sensed signal is input to the control circuit 38 over line 35 (isolated or non-isolated) for processing. Those skilled in the art will appreciate that the power/energy meter module 32 may sense an aggregate power/energy drawn by the load 14 and the power supply 30 if the total power/energy in the hot lead 16 is monitored. Of course, the power/energy drawn by the load 14 may be distinguished from the total power/energy using any of the known techniques (such as placing a current measuring device in series with the load 14 and not the power supply 30).

The output circuit 33 includes the power ON/OFF switching circuit 34 and the variable power switching circuit 36. The power ON/OFF switching circuit 34 preferably provides a connect/disconnect of the input power/energy from the AC source 12 to the load 14 as a function of a command signal on line 37 from the control circuit 38. This facilitates a total shut down of the load 14 if desired. The power ON/OFF switching circuit 34 preferably provides input power/energy only to the variable power switching circuit 36 over line 21a such that output power/energy to the load 14 may be connected/disconnected.

Alternatively, the power ON/OFF switching circuit 34 may provide input power/energy directly to the load 14 over line 21b and the variable power switching circuit 36 may vary the output power/energy drawn by the load 14 by way of a control signal (e.g., low voltage 0–10 VDC, phase control, PWM, DSI, etc.) over conductor(s) 19. The control signal would be produced directly or indirectly by the control circuit 38 (described in more detail below). Those skilled in the art will appreciate that loads 14 which are controllable by such control signals (e.g., low voltage DC signals) are well known and any of such loads 14 may be utilized with the invention. Additional details of a suitable power ON/OFF switching circuit 34 may be found in U.S. Pat. No. 5,309,068, entitled TWO RELAY SWITCHING CIRCUIT FOR FLUORESCENT LIGHTING CONTROLLER, the entire disclosure of which is hereby incorporated by reference.

The variable power switching circuit 36 preferably receives the input power/energy from the power ON/OFF switching circuit 34 and varies the amount of output power/ energy delivered to the load 14 as a function of a control signal on line 39 from the control circuit 38. The variable power switching circuit 36 preferably includes a switching element (not shown), such as a controllably conductive semiconductor device. Switching elements such as triacs, anti-parallel SCRs, FETs, or IGBTs are particularly well suited for use with the invention. The control signal on line 39 preferably controls a conduction time of the switching element during half cycles of the AC source voltage. Suitable topologies using one or more switching elements to adjust the conduction time are well known in the art and, therefore, a detailed discussion thereof is omitted. The output power/energy from the variable power switching circuit 36 may take the form of a pulse width modulated output (PWM), a frequency controlled output, a forward or reverse phase controlled output, or a DC voltage level output. As discussed above, some loads 14 (e.g., electronic ballasts) have such switching elements internally disposed and require only a control signal (e.g., low voltage DC) to adjust the power/energy drawn by the load 14.

The electrical power controller module 10 is operable to adjust the power/energy available to the load 14 as a function of (i) the control/sensor inputs from the controls and sensors 24 that the control circuit 38 receives over line 41; (ii) the sense signal that the control circuit 38 receives from the power/energy meter module 32 provided over line 35 and (iii) signals that the control circuit 38 receives from the user interface 20 over network 22.

The controls and sensors 24 may include photo sensors, occupancy sensors, temperature sensors, wall controls (e.g., ON/OFF or dimmer controls), timers, switch sensors, infrared sensors, radio frequency controls, and data entry devices (e.g., access keypads, etc.). Those skilled in the art will appreciate that one or more of these controls/sensors may be configured to provide suitable control/sensor inputs over line 41 to the control circuit 38. For example, a control can be a wall control that requests a power/energy light level, a time clock, or any devices that provide switch closure inputs, such as a building management system, to signal a load shed request or an emergency. These controls and sensors can communicate with the control circuit 38 either directly through a wired connection 41, through radiated signal means, or through a network 22 (discussed in more detail below). Additional details concerning controls and sensors 24 may be found in U.S. Pat. No. 5,357,170, entitled LIGHTING CONTROL SYSTEM WITH PRIORITY OVERRIDE, the entire disclosure of which is incorporated herein by reference.

The control circuit 38 preferably produces the control signal on line 39 as a function of at least the sense signal received over line 35 from the power/energy meter module 32. It is most preferred that the control circuit 38 include a micro-processor operating under the control of a stored software program to produce the control signal on line 39, although a strictly hardware implementation may also be used. In a broad sense, the control circuit 38 has access to a stored (or set) threshold representing maximum output power/energy which may be drawn by the load 14. If the load 14 attempts to draw an amount of output power/energy which exceeds the threshold, the control circuit 38 is operable to adjust the control signal on line 39 in such a manner to reduce the output power/energy available from the variable power switching circuit 36. Advantageously, the control circuit 38 need not reduce the available output power/energy to zero when the threshold is exceeded. Rather, the control circuit 38 may optionally limit the output power/energy to the maximum or reduce the output power/energy to some lower level.

The threshold may be a fixed level or may be variable as a function of at least one of: (i) time of day (e.g., sunrise and sunset); (ii) ambient light intensity; (iii) building (or area) personnel occupancy rates; (iv) emergency conditions (e.g., fire, storm, earthquake, etc.); (v) temperature (outside/inside); (vi) electricity cost, i.e., usage rate; and (vii) output power/energy usage history. For example, in the late evening/early morning, there may be little need or desire for the load 14 (e.g., lights, computers, heaters, fans, etc.) to draw high output power/energy, because few people are present to require such utilities and/or a special usage rate may have been negotiated with the electric supplier which requires low power/energy draw. Accordingly, the threshold preferably varies according to time of day such that output power/energy drawn by the load 14 is automatically controlled.

It is most preferred that the threshold be adjusted or set in accordance with a profile (constant or varying) of the software program and that the profile also be adjustable either automatically (for example, by way of electronic sensors) or manually (i.e., adjusted by an administrator).

Adjustment of the threshold profile is preferably accomplished through communications circuit 42 which is preferably operable to provide communications between the electrical power controller module 10 and the user interface 20 using any of the known techniques and communication protocols (e.g., RS-485, infrared signal protocols, power line carrier signal protocols, or radio frequency signal protocols). The user interface 20 may be a centrally located computer or one or more distributed computers, such as PCs.

An administrator (or any other user) may preferably achieve a new threshold profile by inputting a series of parameters to adjust the software program instructions regarding the threshold profile, or may change the computer program altogether by downloading an updated version of software. Additionally, the control circuit 38 may receive usage rate information through the network 22 directly from the utility company which permits the automatic adjustment of the parameters of the threshold profile related to usage rate.

Preferably, the electrical power controller module 10 provides data to the user interface 20 over the network 22, such as present output power/energy draw by the load 14, energy consumption history (e.g., since last requested), hours of operation of load 14, output power/energy draw history (e.g., over a 24 hour period), changed load conditions (e.g., lamp or ballast failures), and sensor data received from controls and sensors 24. These data may assist the administrator in adjusting the parameters of the threshold profile. Further, the power/energy draw history can be used to generate usage reports or manage a maintenance program/schedule.

It is preferred that the energy management system 1 include a plurality of electrical power controller modules 10 coupled to the user interface 20 over the network 22 and each receiving sensor input from the controls and sensors 24. Further, it is preferred that a plurality of threshold profiles be employed to establish priorities on electricity usage. For example, critical areas may receive little power/energy reduction (e.g., an ICU in a hospital) as compared with other areas (e.g., attorney's offices). With this embodiment of the invention, the energy management system 1 may be programmed (e.g., at the user interface 20) to monitor a system level power/energy usage (i.e., an aggregate power/energy drawn by the loads 14 of all, or a subset of, the electrical power controller modules 10 in the system 1). If the system level power/energy usage is exceeded, any one or more of the draws by the loads 14 may be reduced in accordance with the program to maintain the system level power/energy usage at a desired threshold.

In further embodiments of the invention, the controls and sensors 24 may interface with the network 22 directly rather than through the control circuit 38. Thus, the user interface 20 may receive data directly from controls and sensors 24 over the network 22.

In a further embodiment of the invention, a single control circuit 38 controls multiple output circuits 33 within the same electrical power controller module 10 (or distributed within other modules). Further, the electrical power controller module 10 may have one power/energy meter 32 and one output circuit 33 or it may have multiple output circuits 33.

In a further embodiment of the invention, the microprocessor control of the threshold profile and generation of the control signal on line 39 (and/or command signal on line 37) may be accomplished within the user interface unit 20. In this embodiment, the control circuit 38 may be substantially simplified or eliminated as will be apparent to those skilled in the art. More particularly, the power/energy meter module 32 would send the sense signal to the user interface 20 for processing (either in real time or whenever the electrical power controller module 10 is polled, e.g., if the electrical power controller module 10 is connected through the network 22).

In a further embodiment of the invention, if the output power/energy drawn by the load 14 exceeds the threshold, the control circuit 38 displays an alarm message on the local display 40. Local display 40 may be an LCD, a segment display (e.g., seven segments), a monitor, or the like. Alternatively, the electrical power controller module 10 may sound an audible alarm or send a signal to the user interface 20 in the form of a warning or e-mail message indicating that the load 14 has drawn output power/energy exceeding the threshold. Optionally, the user interface 20 may display a warning message and/or sound an alarm. The local display 40 may also display the real time output power/energy draw, the power/energy draw history, and/or the sensor data from the controls/sensors 24.

In still a further embodiment of the invention, fluorescent lamps may be properly "seasoned" at a predetermined power/energy level, preferably full power/energy, for a predetermined period of time (e.g., 100 hours) prior to dimming in order to maximize lamp life. The electrical power controller module 10 is preferably programmed to automatically season new lamps. U.S. patent application Ser. No. 09/123,722, entitled FLUORESCENT LAMP DIMMER SYSTEM WITH LAMP SEASONING, provides additional details regarding lamp seasoning and is hereby incorporated by reference in its entirety.

Moreover, the electrical power controller module 10 (alone or in combination with an external processor, e.g., the user interface 20) may preferably be programmed to keep track of power/energy usage history (e.g., lamp operating hours or lamp on/off cycles) to generate maintenance reports which are capable of signaling the user when load components (e.g., lamps, ballasts, motors, etc.) need to be replaced. These reports may also signal when the electrical power controller module 10 itself requires replacement or maintenance.

The power/energy management system 1 and/or electrical power controller module 10 of the present invention provides, among others, the following advantages:

(i) better electric rates may be negotiated with the utility company because power/energy draw may be manually or automatically reduced to stay within contractual guidelines and/or rate information may be obtained through the network 22 directly from the utility company to adjust the threshold profile;

(ii) energy may be conserved and lower electric bills achieved because actual power/energy draw may be controlled;

(iii) capital and/or maintenance expense savings may be achieved because lighting loads, such as incandescent bulbs, will last longer when powered at lower levels;

(iv) capital and/or maintenance expense savings may also be achieved because lighting loads, such as fluorescent lamps, will last longer when properly seasoned; and (v) capital and/or maintenance expense savings may also be achieved by group re-lamping, signaled by detecting changes in power/energy draw by the load.

Figure 2:
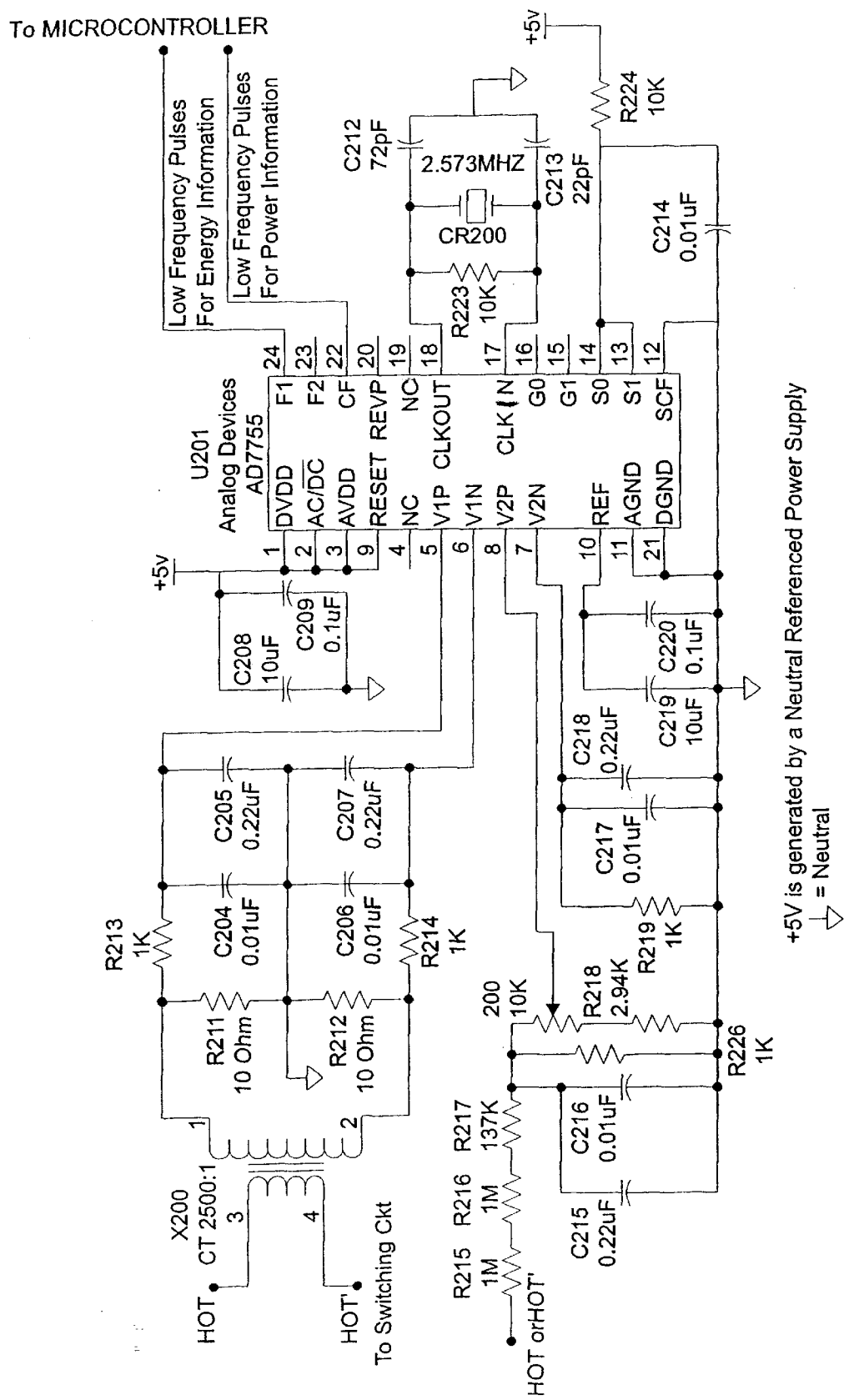
FIG. 2. is an electrical schematic for the power /energy meter module of the present invention.

With reference to FIG. 2, a schematic diagram for a preferred power/energy meter module 32 is shown. Although the schematic details a preferred circuit, any electrical device that measures the instantaneous or average power drawn by (or energy consumed by) at least the load may be used.

In general, a power meter module (capable of measuring real power even in a reactive load) measures voltage, current, and phase and produces a product thereof to obtain the instantaneous or average power. If either of the voltage and current is fixed, the instantaneous or average power may be obtained directly from the other of the voltage and current. An energy meter measures power over units of time.

As shown in FIG. 2, Analog Devices AD 7755 energy metering integrated circuit (IC) U201 with pulse output provides instantaneous and average real power based on line voltage, current and phase. A white paper, entitled SOLID STATE SOLUTIONS FOR ELECTRICITY METEROLOGY, by Anthony Collins contains additional details of the AD-7755 and is hereby incorporated by reference in its entirety.

The IC U201 receives an input voltage representing current draw by the load 14 through pins V1P and V1N. A primary winding of a current transformer (CT) is coupled in series with the hot lead 16 to sense the current therein. The secondary winding of the CT produces a proportional current (which is a function of the turns ratio) to that flowing in the primary. Preferably the turns ratio is about 2500:1. Resistors R213, R214 convert the sensed current into the input voltage across V1P, V1N. The IC U201 receives an input voltage representing the voltage at hot lead 16 through pin V2P and V2N.

The output of the IC at F1, CF produces a low frequency pulse for energy information and a high frequency pulse for power information, respectively. These outputs are preferably input to the control circuit 38 (FIG. 1) for processing as discussed hereinabove. Advantageously, the IC U201 is highly accurate and permits the electrical power controller module 10 to detect very slight reductions in output power/energy draw (e.g., when a lamp or ballast fails). This accuracy enables the electrical power controller module 10 to signal the end user that a lamp/ballast requires replacement, thereby saving operational costs for the building/area.

Figure 3:
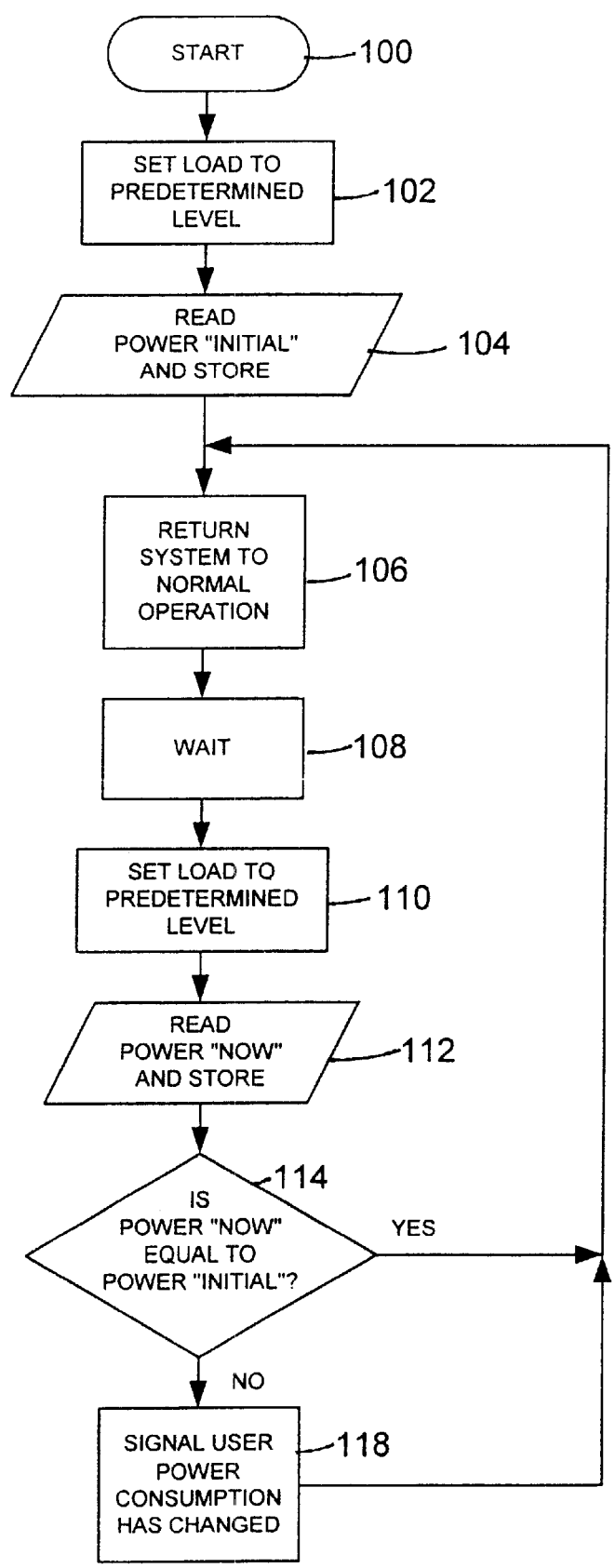
FIG. 3. is a flowchart for detecting a change in power/ energy consumption in accordance with the invention.

Reference is now made to FIG. 3. which is a flowchart illustrating a preferred method for detecting a change in power/energy consumption caused, for example, by a failed or aged lamp or ballast. The method preferably detects changes between present power/energy consumption and predetermined (or initial power/energy consumption) on a periodic basis. The process is preferably started at step 100 automatically via the program within control circuit 38 (or user interface 20) or manually. At step 102, the electrical power controller module 10 commands a particular output power/energy to the load (e.g., 100%, irrespective of the actual control/sensor signals from controls and sensors 24). The electrical power controller module 10, measures this "initial power/energy" drawn by the load 14 and stores it at step 104. Preferably, this initialization routine is performed once during a system initialization routine.

The system is then returned to normal operation at step 106 and waits for a period of time (step 108). The wait can be a predetermined time period (i.e. 24 hours) or until the program receives a signal to compare present power/energy consumption with the initial power/energy consumption (e.g., by an administrator, a time clock, etc.). After the wait step, the electrical power controller module 10 again commands the particular output power/energy to the load (e.g., 100%) such that the load 14 should draw the same output power/energy (step 110). At step 112, the present output power/energy "now" is measured by the electrical power controller module 10.

At step 114, a comparison of the "initial" and "now" output power/energy levels is made and, if the values are substantially equal, the system is returned to normal operation at step 106. If the values are not equal, a signal is provided to the user that the power/energy consumption has changed (step 118). Differences in "initial" and "now" power/energy levels may be caused by lamp or ballast failure, additional load, a failed lamp being replaced with an improper wattage lamp, etc.

According to another aspect of the invention, the electrical power controller module 10 obtains a matrix of "initial" power/energy levels drawn by the load by commanding a series of output power/energy levels to the load (e.g., 1%, 2%, 3%, ... 100%, irrespective of the actual control/sensor signals from controls and sensors 24) at step 102. The electrical power controller module 10, measures a series of "initial power/energy" drawn by the load 14 at each commanded level and stores them at step 104. Preferably, this initialization routine is performed once during a system initialization routine.

The system is then returned to normal operation at step 106 and waits for a period of time (step 108). The wait can be a predetermined time period, e.g., until the program receives a signal to compare present power/energy consumption with the initial power/energy consumption matrix. The electrical power controller module 10 need not again command a particular output power/energy to the load to compare "initial" and "now" values of power/energy drawn as in steps 110 and 112. Instead, at step 114, the electrical power controller module 10 determines what power/energy level should be drawn by the load 14 based on the present control/sensor signals by obtaining the "initial" output power/energy level from the matrix which corresponds with the present control/sensor signals. The initial output power/energy level is compared with the power/energy level presently being drawn by the load 14. If the values are substantially equal, the system is returned to normal operation at step 106. If the values are not equal, a signal is provided to the user that the power/energy consumption has changed (step 118).

The present invention may be embodied in other specific forms without departing from the spirit or essential attributes thereof, and accordingly, reference should be made to the appended claims, rather than to the foregoing specification, as indicating the scope of the invention.

What is claimed is:

1. A circuit for controlling power drawn by a load from a source of utility power, comprising:
    at least one input indicative of power drawn by said load;
    a control circuit connected to said at least one input and having a criteria for producing a control signal based on a value of said at least one input;
    an output circuit controllable to receive power from said source and deliver power to said load; and
    said control signal can control said output circuit effective to vary power delivered to said load, whereby said load draws power according to said criteria of said control circuit.

2. The circuit for controlling power drawn by a load according to claim 1, wherein:
    said criteria is a threshold power draw; and
    said control signal is effective to control said output circuit to maintain a draw of said load at or below said threshold.

3. The circuit for controlling power drawn by a load according to claim 1, wherein:
    said criteria determines ON/OFF switching of power supplied to said load; and
    said control signal causes said output circuit to switch power supplied to said load ON and OFF.

4. The circuit for controlling power drawn by a load according to claim 1, further comprising a power monitor circuit effective to obtain a sense of at least one of a power and an energy drawn by said load and to provide said at least one input to said control circuit.

5. The circuit for controlling power drawn by a load according to claim 4, wherein said sense is obtained at said source.

6. The circuit for controlling power drawn by a load according to claim 4, wherein said sense is obtained at said load.

7. The circuit for controlling power drawn by a load according to claim 1, further comprising:
    a power control device operable to supply a request for a specific power draw by said load; and
    said power control device is connected to said at least one input.

8. The circuit for controlling power drawn by a load according to claim 1, further comprising:
    a sensor operable to detect environment conditions related to an operation of said load; and
    said sensor is connected to said at least one input.

9. The circuit for controlling power drawn by a load according to claim 1, wherein said control circuit further comprises:
    a processor;
    a memory storage effective to store processor instructions;
    said criteria is determined by said processor instructions; and
    said processor can produce a criteria result when said processor instructions are executed.

10. The circuit for controlling power drawn by a load according to claim 9, wherein:
    said criteria is a threshold power draw value; and
    said output circuit can actuate said load whereby power drawn by said load is not greater than said threshold.

11. The circuit for controlling power drawn by a load according to claim 1, wherein:
    said output circuit includes a switch effective to disconnect said source power from said load; and an operation of said switch is controllable by said control signal.

12. The circuit for controlling power drawn by a load according to claim 11, wherein:
said output circuit further includes a variable power control circuit effective to vary a power draw of said load; and
an operation of said variable power control circuit is responsive to said control signal.

13. The circuit for controlling power drawn by a load according to claim 1, further comprising:
a user interface device;
said user interface device includes said control circuit; and
said user interface device is effective to permit a person to interact with parameters of said control circuit.

14. The circuit for controlling power drawn by a load according to claim 1, wherein:
said criteria includes a load power draw reduction value;
said reduction value permits said control signal to control said output circuit to reduce power drawn by said load.

15. The circuit for controlling power drawn by a load according to claim 14, wherein:
said reduction value is a dynamic result based on a calculation; and
said calculation depends upon said criteria and said input.

16. The circuit for controlling power drawn by a load according to claim 1, wherein:
said criteria is a control profile including a set of parameters; and
said parameters are adjustable, whereby said control signal may be modified in accordance with a desired load power draw result.

17. The circuit for controlling power drawn by a load according to claim 1, further comprising:
a communication circuit connected to said control circuit;
said at least one input is connected to said control circuit through said communication circuit; and
a user interface is connected to said control circuit through said communication circuit.

18. The circuit for controlling power drawn by a load according to claim 17, wherein said user interface can record operational data obtained from said control circuit over said communication circuit.

19. The circuit for controlling power drawn by a load according to claim 18, wherein said data is formatted to provide reports for at least power usage and maintenance scheduling.

20. The circuit for controlling power drawn by a load according to claim 1, wherein said control circuit further comprises a plurality of control signals effective to control a plurality of output circuits.

21. The circuit for controlling power drawn by a load according to claim 1, further comprising:
a status enunciation unit in proximate location with said control circuit; and
said control circuit can actuate said status enunciation unit to provide a status indication of said circuit.

22. The circuit for controlling power drawn by a load according to claim 1, wherein said criteria includes information sufficient to permit said control signal to drive said output circuit effective to season a lamp thereby permitting a longer usage life for said lamp.

23. The circuit for controlling power drawn by a load according to claim 22, wherein said criteria further includes information sufficient to derive an aspect of said control signal effective to dim said seasoned lamp.

24. A circuit for controlling power drawn from a source of utility power and delivered to a load, the circuit comprising:
a power monitoring circuit operable to produce a sense signal indicative of an amount of output power drawn by the load;
a control circuit operable to receive the sense signal from the power monitoring circuit and to produce a control signal indicative of whether the amount of power drawn from the source by the load has exceeded a threshold; and
an output circuit operable to receive input power from the source and deliver the output power to the load, the output circuit reducing the output power when the control signal indicates that the threshold has been exceeded.

25. The circuit for controlling power drawn by a load according to claim 24, wherein said control circuit further comprises:
a processor;
a memory storage effective to store processor instructions; and
said control signal is determined by said processor instructions.

26. The circuit for controlling power drawn by a load according to claim 24, wherein:
said output circuit includes a switch effective to disconnect said source power from said load; and
an operation of said switch is controllable by said control signal.

27. The circuit for controlling power drawn by a load according to claim 24, wherein:
said output circuit further includes a variable power control circuit effective to vary a power draw of said load; and
an operation of said variable power control circuit is responsive to said control signal.

28. The circuit for controlling power drawn by a load according to claim 24, further comprising:
a user interface device;
said user interface device includes said control circuit; and
said user interface device is effective to permit a person to interact with parameters of said control circuit.

29. The circuit for controlling power drawn by a load according to claim 28, wherein:
said control circuit includes a control profile;
said control profile includes said parameters; and
said user interface controller can access and adjust said parameters, whereby said control signal may be modified in accordance with a desired load power draw result.

30. The circuit for controlling power drawn by a load according to claim 29, further comprising:
a communication circuit connected to said control circuit; and
said at least one input is connected to said control circuit through said communication circuit.

31. The circuit for controlling power drawn by a load according to claim 30, wherein said user interface controller can record operational data obtained from said control circuit over said communication circuit.

32. The circuit for controlling power drawn by a load according to claim 30, wherein said control circuit is capable of controlling a plurality of output circuits through said communication circuit.

33. The circuit for controlling power drawn by a load according to claim 24, wherein said control circuit includes information sufficient to permit said control signal to drive said output circuit effective to season a lamp thereby permitting a longer usage life for said lamp.

34. The circuit for controlling power drawn by a load according to claim 33, wherein said criteria further includes information sufficient to derive an aspect of said control signal effective to dim said seasoned lamp.

35. A method for managing the draw of a load on a power supply system comprising:
   sensing at least one of a power and an energy drawn by said load;
   providing to a controller an indication related to said draw based on said sensing;
   using said controller to compare said indication to a known indication of desired draw; and
   using said controller to modify an amount of power supplied to said load based on a result of said comparison.

36. The method for managing the draw of a load according to claim 35, wherein said sensing is conducted at a feed from a utility.

37. The method for managing the draw of a load according to claim 35, wherein said sensing is conducted at said load.

38. A method for detecting change in power consumption in a power control system, comprising:
   setting a command output in said power control system effective to produce a measurable power draw by a load;
   obtaining and storing a reference power draw related to said command output;
   setting at a later point in time said command output in said power control system;
   obtaining an operational power draw by said load at said command setting; and
   comparing said reference power draw and said operational power draw to obtain a comparison result.

39. The method for detecting change in power consumption in a power control system according to claim 38, further comprising providing an indication of said comparison result.

40. The method for detecting change in power consumption in a power control system according to claim 38, further comprising adjusting a power output based on said comparison result.

41. The method for detecting change in power consumption in a power control system according to claim 38, further comprising providing notification to a maintenance entity of system status based on a value of said comparison result.

42. A method for detecting change in power consumption in a power control system, comprising:
   setting sequentially increasing command outputs in said power control system effective to produce a measurably increasing power draw by a load;
   obtaining and storing a reference power draw related to each command output;
   receiving a detection request to determine whether a power consumption rate has changed;
   obtaining an operational power draw related to a command output at a time when said detection request is received; and
   comparing said operational power draw and said reference power draw related to said command output to obtain a comparison result.

43. The method for detecting change in power consumption in a power control system according to claim 42, further comprising providing an indication of said comparison result.

44. The method for detecting change in power consumption in a power control system according to claim 42, further comprising adjusting a power output based on said comparison result.

45. The method for detecting change in power consumption in a power control system according to claim 42, further comprising providing notification to a maintenance entity of system status based on a value of said comparison result.

46. A circuit for controlling power supplied by a utility and drawn by a load, the circuit comprising:
   a monitor circuit coupled to the utility supply for sensing the utility supply and outputting the utility supply, the monitor circuit having a sense output related to the sensed utility supply;
   a power output circuit coupled to the monitor circuit for receiving the utility supply and outputting a load power to the load, the power output circuit having a control input for controlling the power output circuit;
   a controller coupled to the monitor circuit and the power output circuit and operable to receive the sense output from the monitor circuit and determine a control signal provided to the control input of the power output circuit such that the power output circuit is controlled to deliver the load power to the load based on the sense output and thereby control power drawn by the load.

* * * * *